US012103142B2

(12) United States Patent
Hung et al.

(10) Patent No.: US 12,103,142 B2
(45) Date of Patent: Oct. 1, 2024

(54) SCREWDRIVER TIP STRUCTURE

(71) Applicants: Chao-Min Hung, Caotun Township, Nantou County (TW); Bo-Wei Chen, Nantou (TW)

(72) Inventors: Chao-Min Hung, Caotun Township, Nantou County (TW); Bo-Wei Chen, Nantou (TW)

( * ) Notice: Subject to any disclaimer, the term of this patent is extended or adjusted under 35 U.S.C. 154(b) by 328 days.

(21) Appl. No.: 17/859,163

(22) Filed: Jul. 7, 2022

(65) Prior Publication Data

US 2024/0009811 A1 Jan. 11, 2024

(51) Int. Cl.
*B25B 15/00* (2006.01)

(52) U.S. Cl.
CPC .......... *B25B 15/005* (2013.01); *B25B 15/007* (2013.01); *B25B 15/008* (2013.01)

(58) Field of Classification Search
CPC .... B25B 15/008; B25B 15/005; B25B 15/007
See application file for complete search history.

(56) References Cited

U.S. PATENT DOCUMENTS 1,782,981 A * 11/1930 Anderson ............. B25B 15/007 81/441
6,152,000 A * 11/2000 Mowins ................ B25B 15/008 81/436
6,223,634 B1 * 5/2001 Hughes ................. B25B 15/005 411/404
6,397,710 B1 * 6/2002 Baker ................... B25B 15/005 81/436
7,322,265 B2 1/2008 Chen
2006/0112796 A1 * 6/2006 Chen ..................... B25B 15/005 81/436
2016/0059392 A1 * 3/2016 DeLaforcade ........ B25B 15/007 81/439

* cited by examiner

*Primary Examiner* — David B. Thomas
(74) *Attorney, Agent, or Firm* — Chun-Ming Shih; LANWAY IPR SERVICES

(57) ABSTRACT

A screwdriver tip structure includes a main body provided with an operation end. The operation end is provided with multiple first working sections and multiple second working sections. Each of the first working sections has a convex shape. Each of the second working sections has a concave shape. Each of the first working sections is provided with multiple grooves. Each of the first working sections has a first end and a second end. The second end has a diameter more than that of the first end. Each of the first working sections has a periphery provided with a phantom side face. The side face extends from the second end to the first end. Each of the grooves is provided with a first concave face. The first concave face of each of the grooves includes a first single arc.

6 Claims, 9 Drawing Sheets

A-A

B

SCREWDRIVER TIP STRUCTURE

BACKGROUND OF THE INVENTION

1. Field of the Invention

The present invention relates to a hand tool and, more particularly, to a screwdriver tip (or head) structure.

2. Description of the Related Art

A conventional compound screwdriver head was disclosed in the U.S. Pat. No. 7,322,265 (or Taiwanese Patent Publication No. TW-M289681), and comprises a body 20, a first working portion 21, a connecting surface 22, a second working surface 23, an awl portion 24 and a plurality of working grooves 25. One end of the first working portion 21 is connected with the body 20, and the other end is connected with an outer ring 221 of a plurality of connecting surfaces 22. An inner ring 222 of the connecting surface 22 is connected with the second working portion 23. The size of the outer ring 221 is larger than that of the inner ring 222, and the awl portion 24 is formed on the end of the connecting surface 22, the working grooves 25 are extended from the awl portion 24 to the first working portion 21 via the second working portion 23. The first working portion 21 is formed on the cylindrical body 20, including four abutting surfaces 211. The inner ring 222 of the connecting surface 22 is connected with a second abutting surface 231 of the second working portion 23. Similarly, the second working portion 23 includes four second abutting surfaces 231. The screwing and unscrewing of the small bolt as shown in FIG. 4, the second abutting surface 231 of the second working portion 23 is engaged with the screw groove of a small bolt 30 for screwing and unscrewing. Similarly, the screwing and unscrewing of the bigger bolt as shown in FIG. 5, the first abutting surface 211 of the first working portion 21 is engaged with the screw groove of a bigger bolt 40 for screwing and unscrewing.

However, the conventional compound screwdriver head has the following disadvantages.

1. An angle is defined between the connecting surface 22 and the second abutting surface 231 of the second working portion 23 so that the inner ring 222 of the connecting surface 22 has a corner. In such a manner, when the second abutting surface 231 of the second working portion 23 rotates the bolt 40, the inner ring 222 cannot distribute the stress applied on the second abutting surface 231. Thus, the stress is concentrated on the inner ring 222 so that the inner ring 222 is easily broken during operation of the body 20.
2. When the first working portion 21 or the second working surface 23 rotates the bolt 30, the first abutting surface 211 of the first working portion 21 cannot provide an antiskid effect to the bolt 30, and the second abutting surface 231 of the second working portion 23 cannot provide an antiskid effect to the bolt 30.

BRIEF SUMMARY OF THE INVENTION

In accordance with the present invention, there is provided a screwdriver tip structure comprising a main body provided with an operation end. The operation end is provided with multiple first working sections and multiple second working sections. The first working sections and the second working sections are arranged alternately and annularly along an axis of the operation end. Each of the first working sections has a convex shape. Each of the second working sections has a concave shape. Each of the first working sections is provided with multiple grooves. The grooves are spaced and arranged linearly. Each of the first working sections has a first end and a second end. The second end has a diameter more than that of the first end. Each of the first working sections has a periphery provided with a phantom side face. The side face extends from the second end to the first end. Each of the grooves is provided with a first concave face. The first concave face of each of the grooves includes a first single arc.

According to the primary advantage of the present invention, the multiple first single arcs distribute the stress when the operation end drives and rotates the screw member to prevent the operation end from being broken at the grooves during operation of the operation end, thereby enhancing the lifetime of the operation end.

According to another advantage of the present invention, the multiple concave faces provide more contact areas to the operation end so that the multiple concave faces provide a better rotational force when the operation end touches the first face of the screw member.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
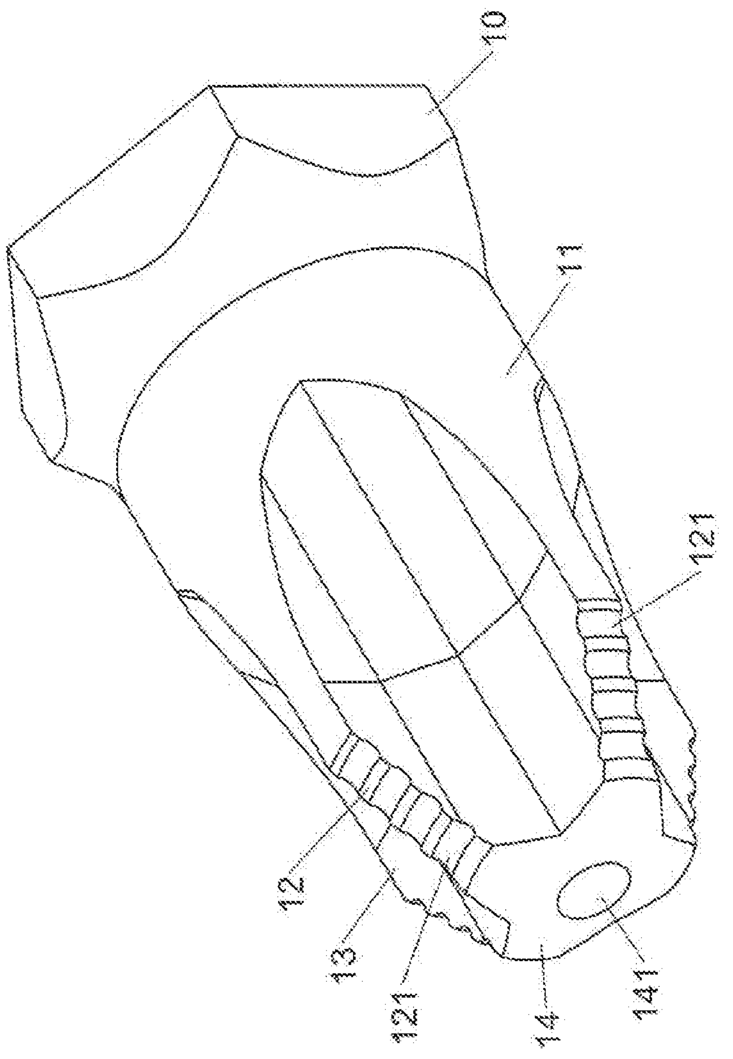
FIG. 1 is a perspective view of a screwdriver tip structure in accordance with the first preferred embodiment of the present invention.
Figure 2:
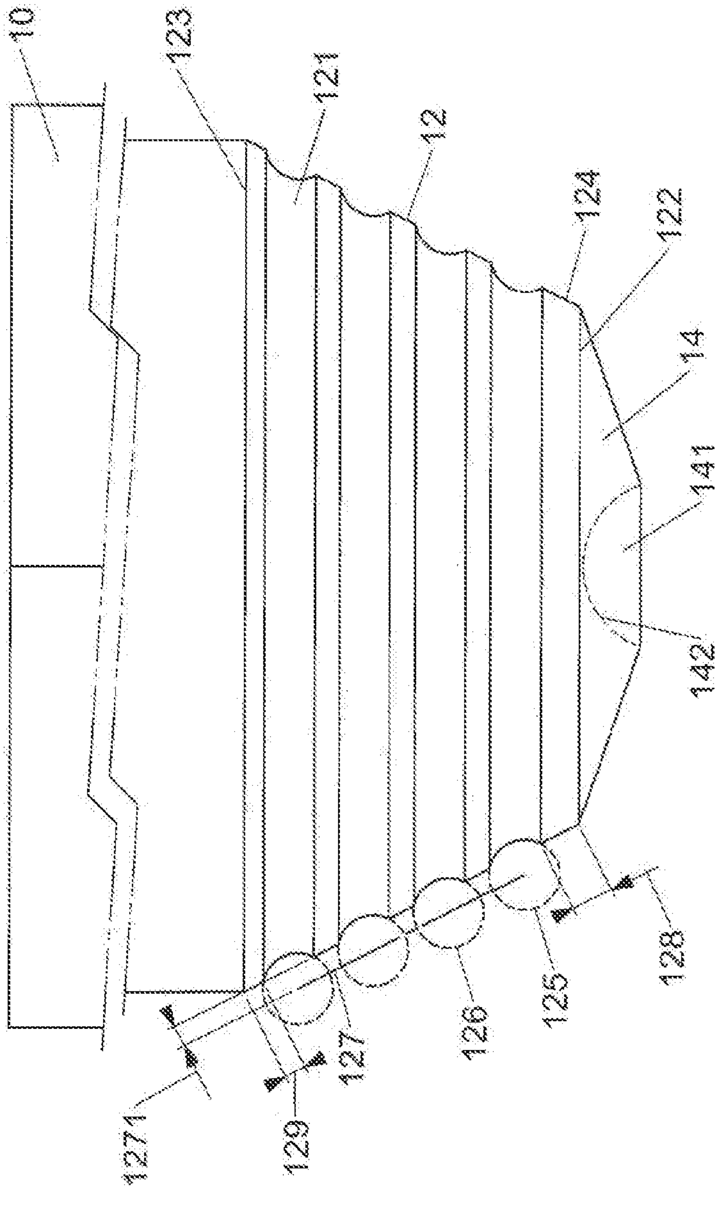
FIG. 2 is a cross-sectional view of the screwdriver tip structure in accordance with the first preferred embodiment of the present invention.
Figure 3:
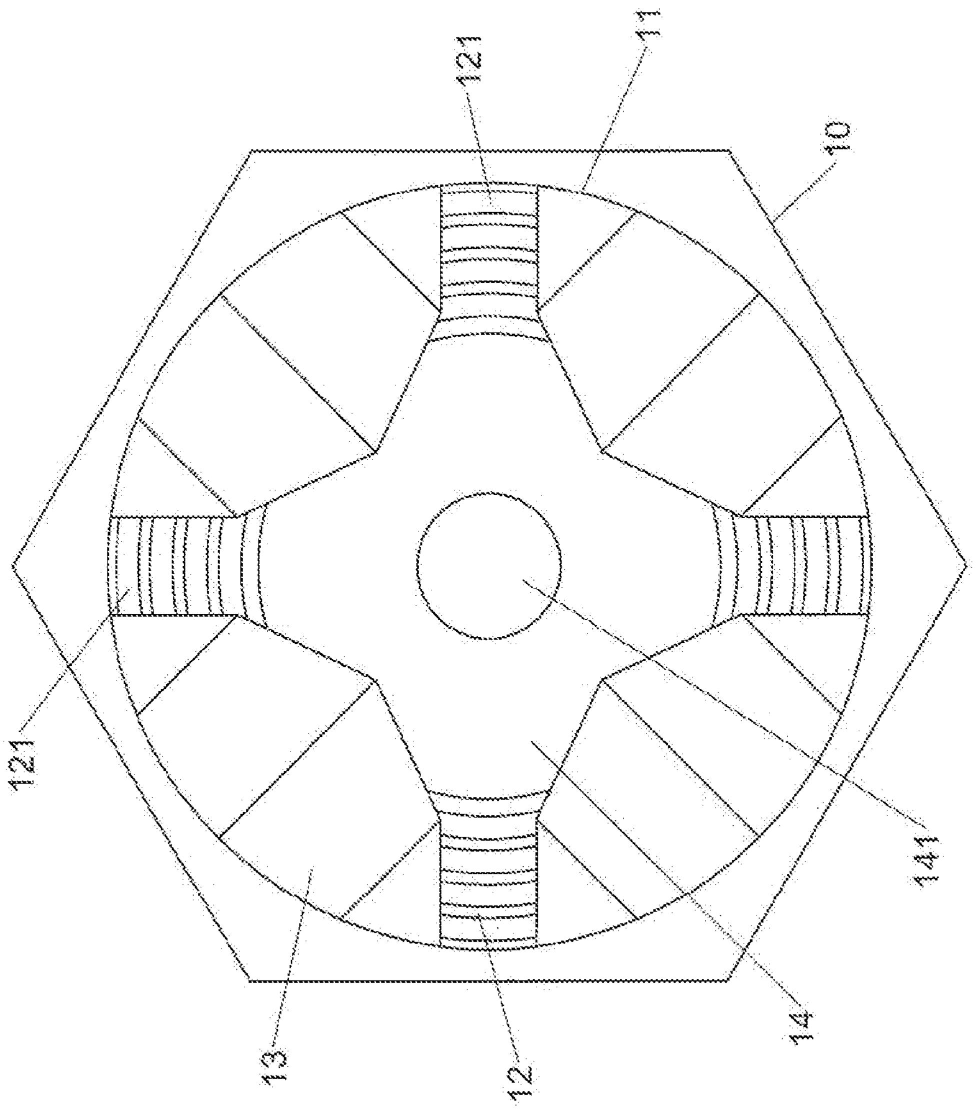
FIG. 3 is a front view of the screwdriver tip structure as shown in FIG. 1.

Referring to the drawings and initially to FIGS. 1-3, a screwdriver tip structure in accordance with the preferred embodiment of the present invention comprises a main body 10. The main body 10 is provided with an operation end 11. The operation end 11 is mounted on a workpiece for rotating the workpiece. The operation end 11 is provided with multiple first working sections 12 and multiple second working sections 13. The first working sections 12 and the second working sections 13 are arranged alternately and annularly along an axis of the operation end 11. Each of the first working sections 12 is disposed between two of the second working sections 13. Each of the second working sections 13 is disposed between two of the first working sections 12. Each of the first working sections 12 has a convex shape. Each of the second working sections 13 has a concave shape. The operation end 11 has four first working sections 12 and four second working sections 13, so that the operation end 11 has a substantially cross (cruciform) shape in cross-section.

Each of the first working sections 12 is provided with multiple grooves 121. The grooves 121 are spaced and arranged linearly. The grooves 121 are parallel with each other. Each of the grooves 121 has the same depth. Each of the first working sections 12 has three, four, five or six grooves 121. Each of the first working sections 12 has a first end 122 and a second end 123. The second end 123 has a diameter more than that of the first end 122. Each of the first working sections 12 has a periphery provided with a phantom side face 124. The side face 124 extends from the second end 123 to the first end 122. The side face 124 is an inclined plane. The side face 124 has a straight shape.

As shown in FIG. 2, the second working sections 13 shown in FIG. 1 are omitted to reduce the lines of the operation end 11 and to facilitate illustration of the first working sections 12. Each of the grooves 121 is provided with a first concave (or recessed) face 125. The first concave face 125 of each of the grooves 121 is an annular peripheral face and includes a first single arc 126 which is constructed by a phantom circle. The first single arc 126 has a center. A connecting line 127 connects the centers of the first single arcs 126 of the first concave faces 125 of the grooves 121. The connecting line 127 is parallel with the side face 124. A first distance 1271 is defined between the connecting line 127 and the side face 124. A second distance 128 is defined between the first end 122 and the first single arc 126 closest (or proximate) to the first end 122. A third distance 129 is defined between the second end 123 and the first single arc 126 closest (or proximate) to the second end 123.

The center of the first single arc 126 is outside of the operation end 11. The first distance 1271 is less than a radius of the first single arc 126 or less than a half of the radius of the first single arc 126. The second distance 128 is more than the radius of the first single arc 126. The second distance 128 is more than the third distance 129 or is double of the third distance 129. The second distance 128 is more than the first distance 1271. The third distance 129 is close to the first distance 1271 or equal to the first distance 1271.

The operation end 11 is provided with an end portion 14. The end portion 14 has a conic shape. The end portion 14 has a center provided with a second concave face 141. The second concave face 141 includes a second single arc 142 which is constructed by a phantom circle. The first end 122 is arranged between the second end 123 and the end portion 14.

The second single arc 142 is outside of the operation end 11. The second single arc 142 is larger than the first single arc 126.

In fabrication, the first concave face 125 closest to the second end 123 is worked and formed initially. Then, the first concave face 125 of each of the grooves 121 is worked and formed serially from the second end 123 to the first end 122. In such a manner, the first working sections 12 are formed. Then, the second concave face 141 is worked and formed. Finally, the second working sections 13 are worked and formed, and the first working sections 12 are divided by the second working sections 13. Thus, the operation end 11 is formed.

Figure 4:
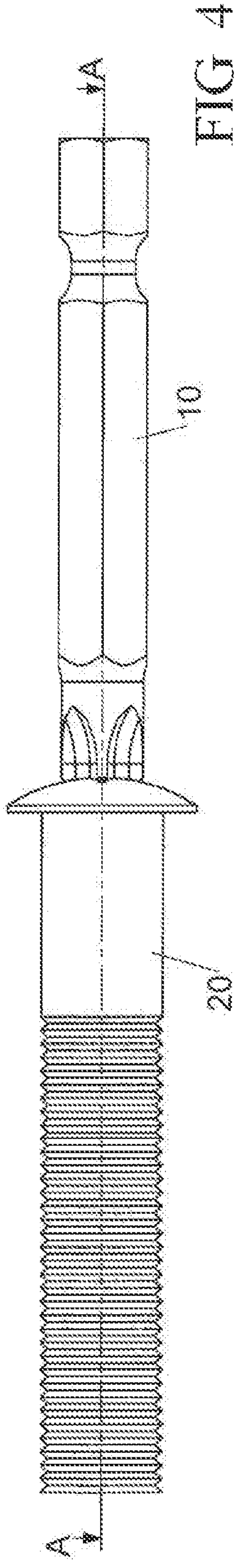
FIG. 4 is a side view showing the screwdriver tip structure assembled with a screw member.
Figure 5:
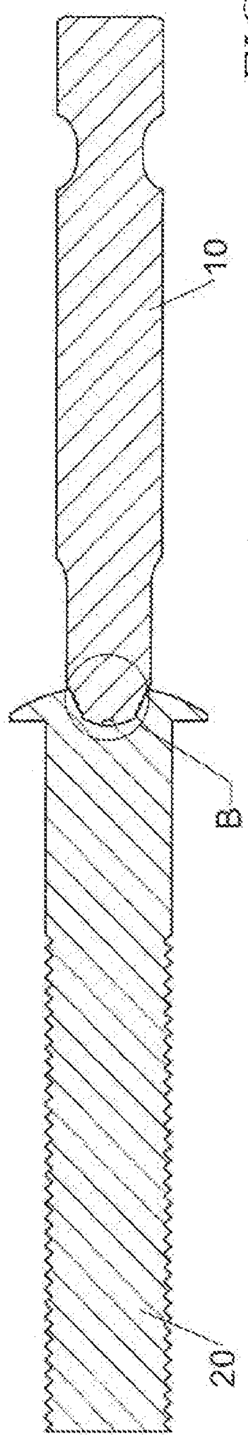
FIG. 5 is a cross-sectional view of the screwdriver tip structure and the screw member as shown in FIG. 4.
Figure 6:
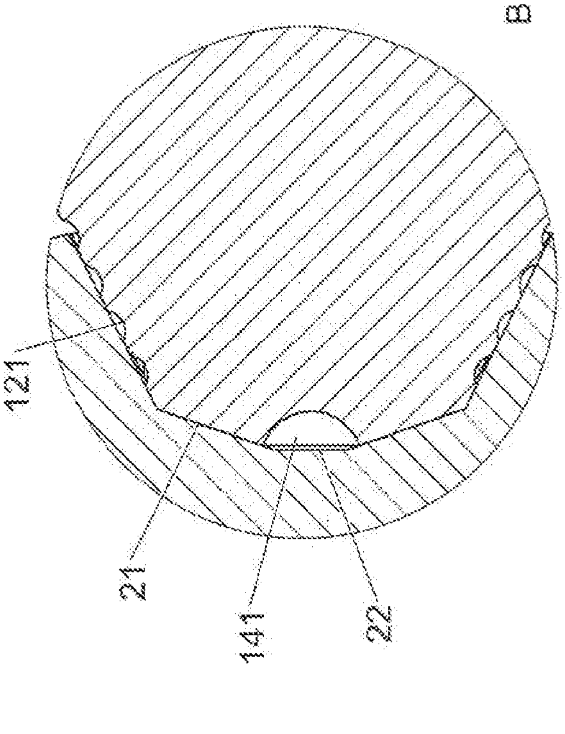
FIG. 6 is a locally enlarged view of the screwdriver tip structure and the screw member taken along a circle B as shown in FIG. 5.

In operation, referring to FIGS. 4-6 with reference to FIGS. 1-3, the main body 10 of the screwdriver tip structure is adapted to operate a screw member 20. The screw member 20 has a first face 21 and a second face 22. The first face 21 produces the second face 22 due to tolerance of a working factor. The second face 22 has a planar shape. The operation end 11 is inserted into the first face 21 of the screw member 20 for rotating the screw member 20. The second face 22 of the screw member 20 extends into the second concave face 141 of the end portion 14 when the operation end 11 is placed in the first face 21 to prevent the end portion 14 from directly contacting the second face 22 of the screw member 20.

Figure 7:
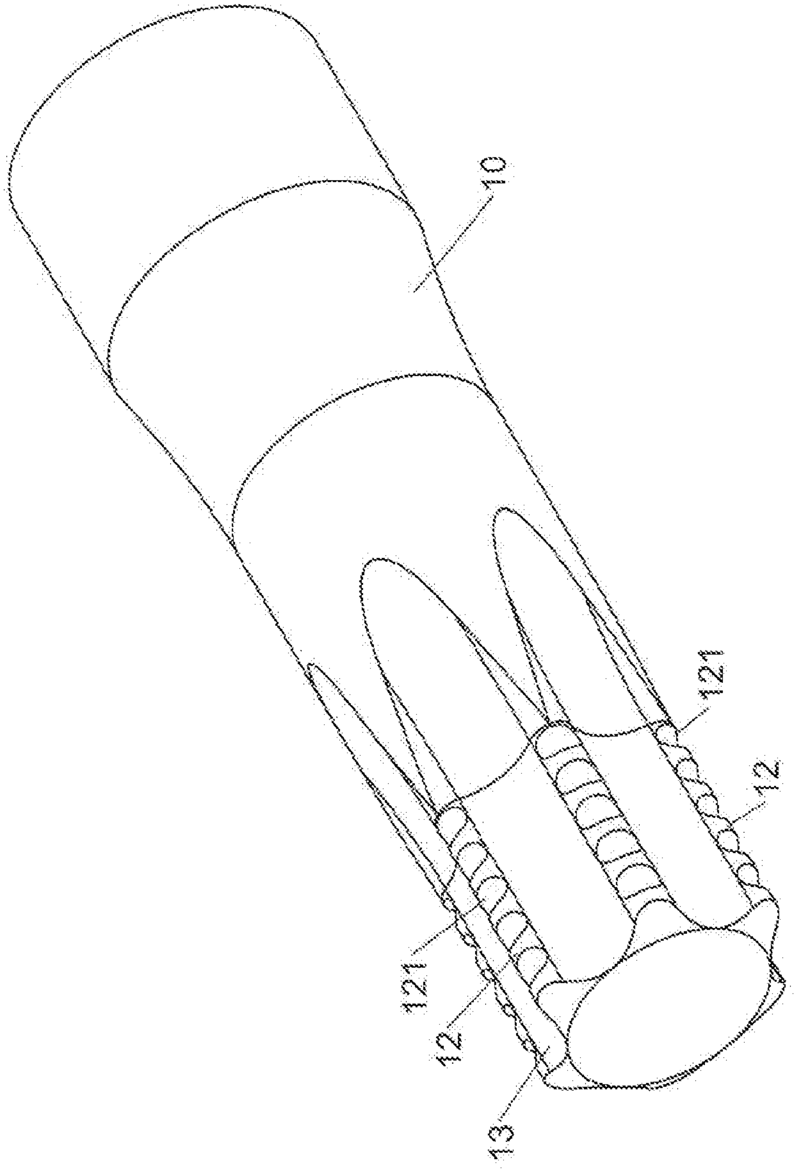
FIG. 7 is a perspective view of a screwdriver tip structure in accordance with the second preferred embodiment of the present invention.

Referring to FIG. 7 with reference to FIGS. 1-3, the operation end 11 has six first working sections 12 and six second working sections 13. The main body 10 is served as a Torx (or star-shaped) screwdriver tip.

Figure 8:
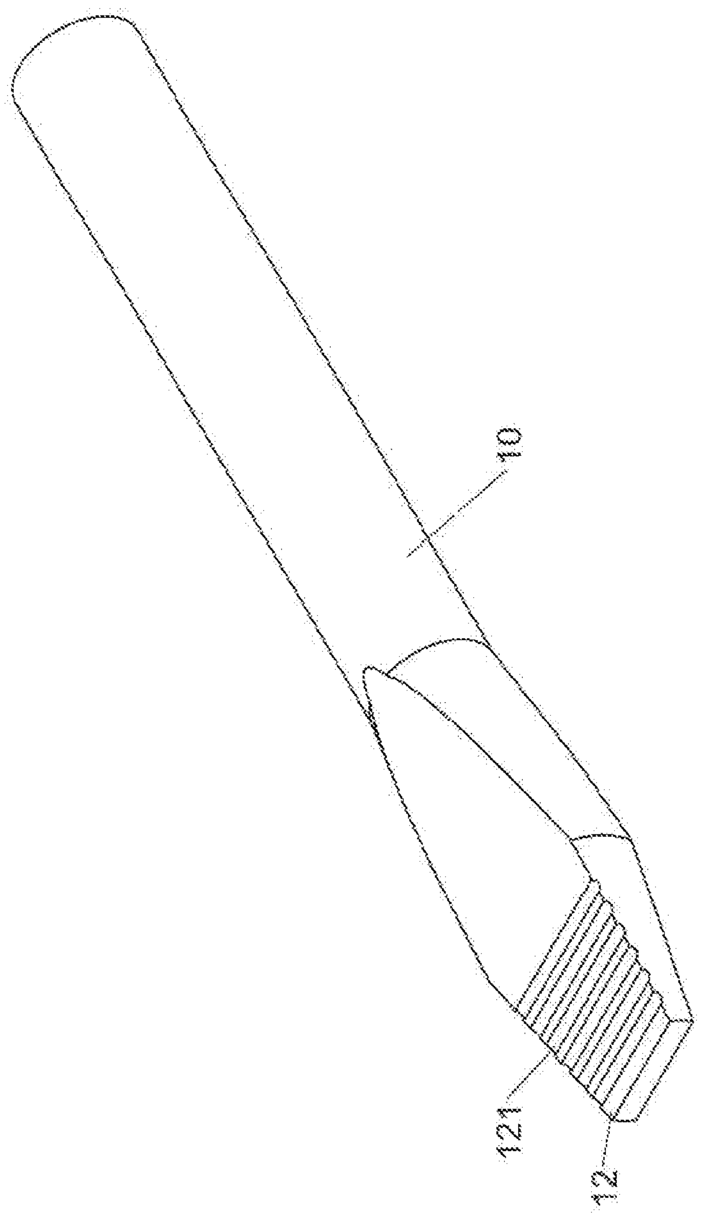
FIG. 8 is a perspective view of a screwdriver tip structure in accordance with the third preferred embodiment of the present invention.

Referring to FIG. 8 with reference to FIGS. 1-3, the second working sections 13 are undefined, and the operation end 11 has two first working sections 12. The two first working sections 12 are arranged symmetrically relative to the operation end 11. The main body 10 is served as a flat screwdriver tip.

Figure 9:
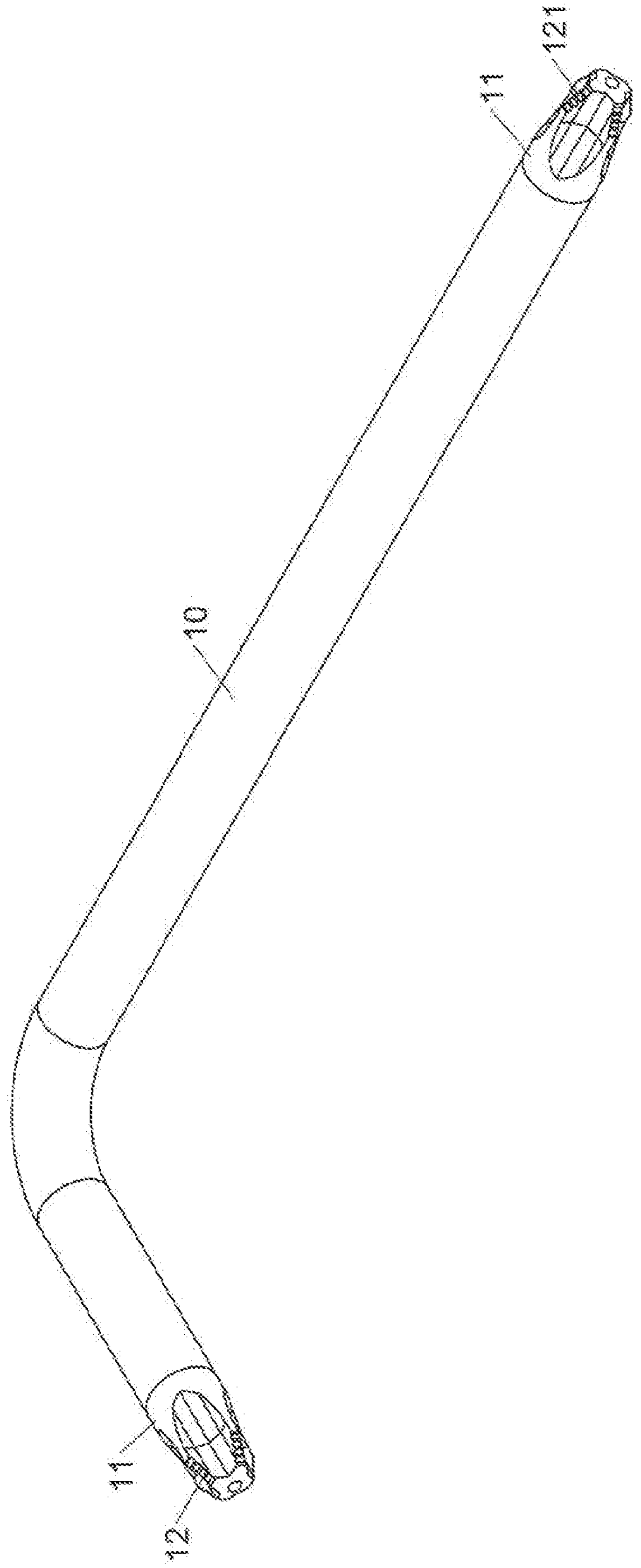
FIG. 9 is a perspective view of a screwdriver tip structure in accordance with the fourth preferred embodiment of the present invention.

Referring to FIG. 9 with reference to FIGS. 1-3, the main body 10 has a substantially L-shaped configuration. The main body 10 has two ends each provided with the operation end 11. The main body 10 is served as a hex wrench.

Figure 10:
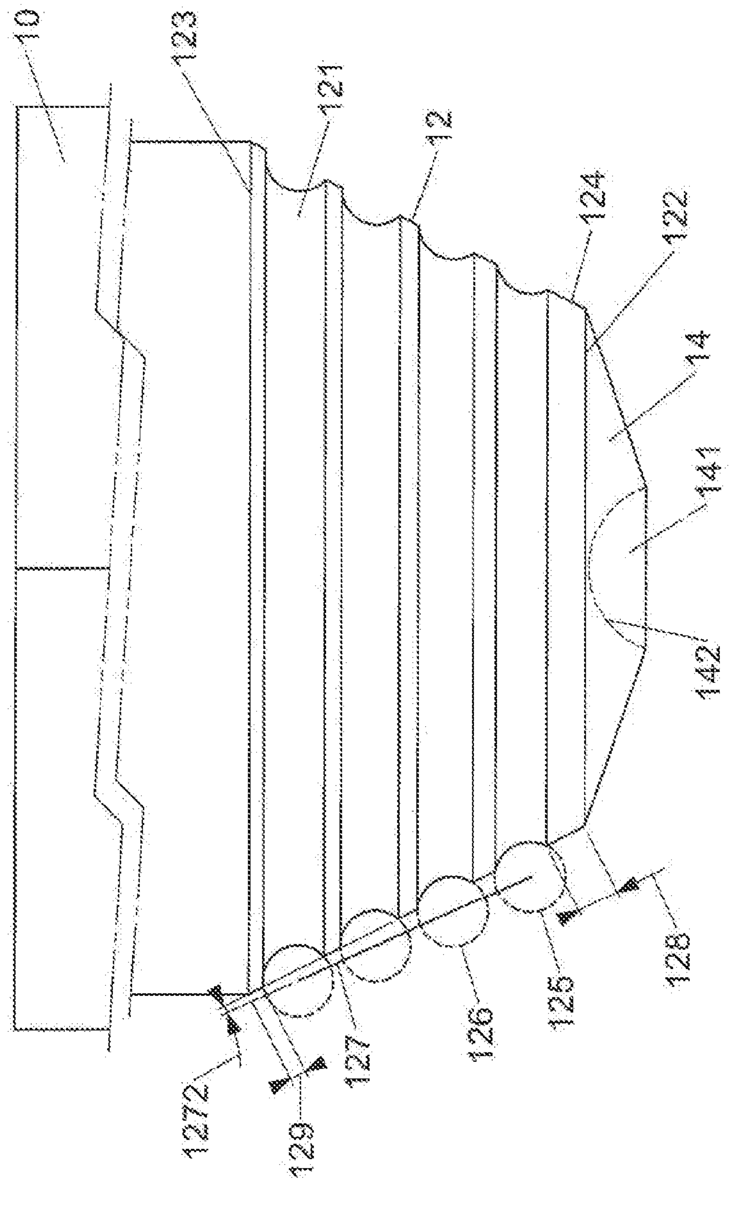
FIG. 10 is a cross-sectional view of a screwdriver tip structure in accordance with the fifth preferred embodiment of the present invention.

Referring to FIG. 10 with reference to FIGS. 1-3, the connecting line 127 is unparallel with the side face 124. The first concave face 125 has a depth gradually increased from the first end 122 to the second end 123. The depth of the first concave face 125 is defined as the maximum distance between the side face 124 and the first single arc 126. The first concave face 125 has a radius gradually decreased from the first end 122 to the second end 123. An angle 1272 is defined between the connecting line 127 is unparallel with the side face 124. The angle 1272 is ranged between 2° and 8° or the angle 1272 is less than 5°.

Figure 11:
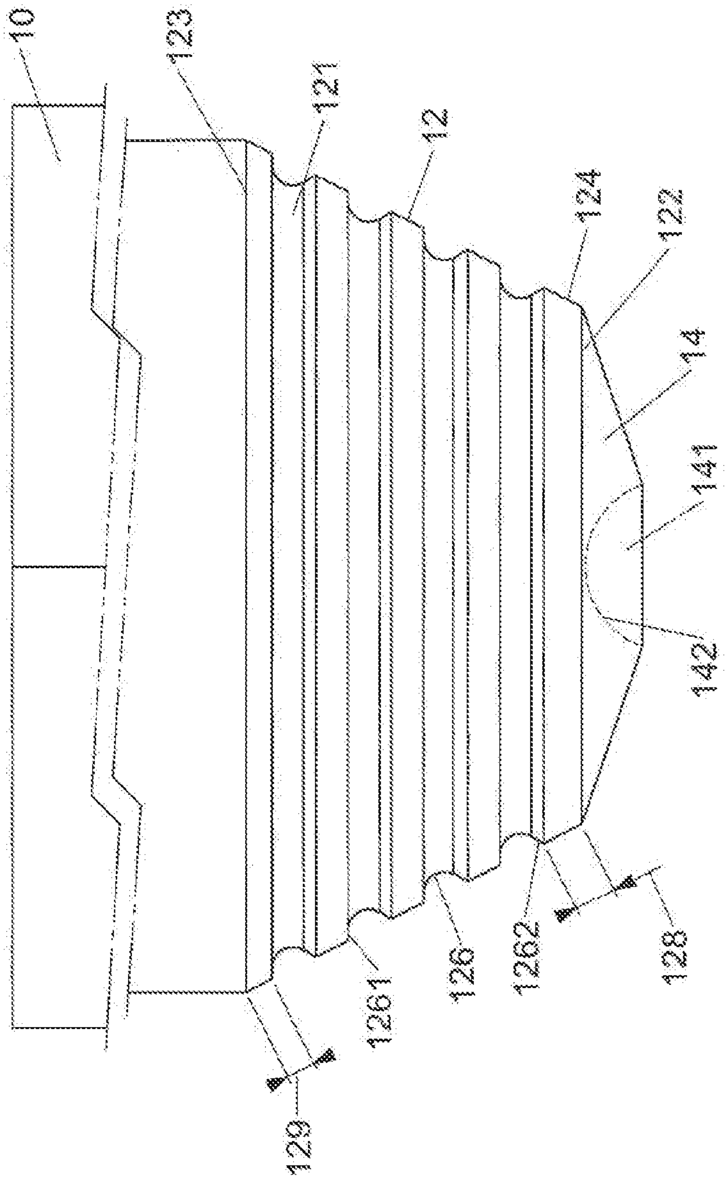
FIG. 11 is a cross-sectional view of a screwdriver tip structure in accordance with the sixth preferred embodiment of the present invention.

Referring to FIG. 11 with reference to FIGS. 1-3, the first concave face 125 further includes a first line 1261 and a second line 1262. The first line 1261 connects one side of the first single arc 126. The second line 1262 connects the other side of the first single arc 126. The first single arc 126 is arranged between the first line 1261 and the second line 1262. The first line 1261 is tangent to the first single arc 126. The second line 1262 is tangent to the first single arc 126. The first line 1261 is perpendicular to the axis of the operation end 11.

Accordingly, the screwdriver tip structure of the present invention has the following advantages.

1. The multiple first single arcs 126 distribute the stress when the operation end 11 drives and rotates the screw member 20 to prevent the operation end 11 from being broken at the grooves 121 during operation of the operation end 11, thereby enhancing the lifetime of the operation end 11.
2. The multiple concave faces 125 provide more contact areas to the operation end 11 so that the multiple concave faces 125 provide a better rotational force when the operation end 11 touches the first face 21 of the screw member 20.

3. The second face 22 of the screw member 20 extends into the second concave face 141 of the end portion 14 when the operation end 11 is placed in the first face 21 to increase the contact area between the first working sections 12 of the operation end 11 and the screw member 20 so that the end portion 14 and the first working sections 12 are closely fit in the first face 21 of the screw member 20, to prevent the operation end 11 from being worn out due to a relative friction when the operation end 11 drives and rotates the screw member 20, to increase the operational torque, and to distribute the stress. The second face 22 of the screw member 20 is received in the second concave face 141 of the end portion 14, so that the main body 10 keeps the end portion 14, and the operation end 11 has a shape similar to that of the conventional screwdriver tip structure. In general, the end portion 14 increase the rotational torque and is mounted easily and conveniently.
4. Each of the first working sections 12 is provided with at least three grooves 121 so that the operation end 11 is used for operating the screw member 20 of three different sizes and specifications.
5. The first working sections 12 are available for a Torx screwdriver tip, a flat screwdriver tip or a hex wrench to enhance the versatility of the screwdriver tip structure of the present invention.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the scope of the invention.

The invention claimed is:

1. A screwdriver tip structure comprising:
a main body;
wherein:
the main body is provided with an operation end;
the operation end is provided with multiple first working sections and multiple second working sections;
the first working sections and the second working sections are arranged alternately and annularly along an axis of the operation end;
each of the first working sections is disposed between two of the second working sections;
each of the second working sections is disposed between two of the first working sections;
each of the first working sections has a convex shape;
each of the second working sections has a concave shape;
the operation end has four first working sections and four second working sections, so that the operation end has a cross shape in cross-section;
each of the first working sections is provided with multiple grooves;
the grooves are spaced and arranged linearly;
the grooves are parallel with each other;
each of the grooves has the same depth;
each of the first working sections has three, four, five or six grooves;
each of the first working sections has a first end and a second end;
the second end has a diameter more than that of the first end;
each of the first working sections has a periphery provided with a phantom side face;
the side face extends from the second end to the first end;
the side face is an inclined plane;
the side face has a straight shape;
each of the grooves is provided with a first concave face;
the first concave face of each of the grooves includes a first single arc;
the first single arc has a center;
a connecting line connects the centers of the first single arcs of the first concave faces of the grooves;
the connecting line is parallel with the side face;
a first distance is defined between the connecting line and the side face;
a second distance is defined between the first end and the first single arc closest to the first end;
a third distance is defined between the second end and the first single arc closest to the second end;
the center of the first single arc is outside of the operation end;
the first distance is less than a radius of the first single arc or less than a half of the radius of the first single arc;
the second distance is more than the radius of the first single arc;
the second distance is more than the third distance or is double of the third distance;
the second distance is more than the first distance;
the third distance is close to the first distance or equal to the first distance;
the operation end is provided with an end portion;
the end portion has a conic shape;
the end portion has a center provided with a second concave face;
the second concave face includes a second single arc;
the first end is arranged between the second end and the end portion;
the second single arc is outside of the operation end;
the second single arc is larger than the first single arc;
the first concave face closest to the second end is worked and formed initially, the first concave face of each of the grooves is then worked and formed serially from the second end to the first end, the second concave face is then worked and formed, and the second working sections are then worked and formed.

2. The screwdriver tip structure as claimed in claim 1, wherein:
the main body of the screwdriver tip structure is adapted to operate a screw member;
the screw member has a first face and a second face;
the second face has a planar shape;
the operation end is inserted into the first face of the screw member for rotating the screw member; and
the second face of the screw member extends into the second concave face of the end portion when the operation end is placed in the first face.

3. The screwdriver tip structure as claimed in claim 1, wherein:
the operation end has six first working sections and six second working sections, and the main body is served as a Torx screwdriver tip; or
the main body is served as a flat screwdriver tip; or
the main body has an L-shaped configuration, the main body has two ends each provided with the operation end, and the main body is served as a hex wrench.

4. The screwdriver tip structure as claimed in claim 1, wherein:
the connecting line is unparallel with the side face;

the first concave face has a depth gradually increased from the first end to the second end;

an angle is defined between the connecting line is unparallel with the side face; and the angle is ranged between 2° and 8° or the angle is less than 5°.

5. The screwdriver tip structure as claimed in claim 4, wherein the first concave face has a radius gradually decreased from the first end to the second end.

6. The screwdriver tip structure as claimed in claim 1, wherein:

the first concave face further includes a first line and a second line;

the first line connects one side of the first single arc;

the second line connects the other side of the first single arc;

the first single arc is arranged between the first line and the second line;

the first line is tangent to the first single arc;

the second line is tangent to the first single arc; and the first line is perpendicular to the axis of the operation end.

* * * * *